United States Patent [19]
Uematsu

[11] Patent Number: 4,469,420
[45] Date of Patent: Sep. 4, 1984

[54] DEVICE FOR PREVENTING BOUNCE OF THE MOVABLE MIRROR IN A SINGLE LENS REFLEX CAMERA

[75] Inventor: Kimio Uematsu, Tokyo, Japan
[73] Assignee: Nippon Kogaku K.K., Tokyo, Japan
[21] Appl. No.: 424,261
[22] Filed: Sep. 27, 1982
[30] Foreign Application Priority Data
  Jan. 30, 1982 [JP] Japan ................... 57-12570
[51] Int. Cl.³ .............................. G03B 19/12
[52] U.S. Cl. .................................. 354/153
[58] Field of Search ..................... 354/152–158
[56] References Cited
  U.S. PATENT DOCUMENTS
  3,568,585  3/1971  Ishizaka ..................... 354/156
  4,192,598  3/1980  Sato et al. .................. 354/153
  4,348,088  9/1982  Yamamichi et al. ......... 354/152

Primary Examiner—John Gonzales
Attorney, Agent, or Firm—Fitzpatrick, Cella, Harper & Scinto

[57] ABSTRACT

A device for preventing bounce of a movable mirror in a single lens reflex camera includes a movable member moving for a predetermined distance in response to the drive of the mirror from a first position located within a phototaking light path for observing an object to be photographed to a second position located outside of the phototaking light path when the phototaking is effected. The movable member forcibly moves the mirror out of the phototaking light path, and after a predetermined time interval from the start of the movement of this movable member, starts the shutter release.

6 Claims, 6 Drawing Figures

DEVICE FOR PREVENTING BOUNCE OF THE MOVABLE MIRROR IN A SINGLE LENS REFLEX CAMERA

BACKGROUND OF THE INVENTION

1. Field of the Invention

This invention relates to an improvement of the device for preventing the bounce or rebounding of the movable mirror of a single lens reflex camera.

2. Description of the Prior Art

As is well known, a single lens reflex camera has a movable mirror in front of the film surface. The movable mirror is obliquely disposed to form a predetermined angle, for example, 45° relative to a phototaking optical path, and, when a release button is depressed, the mirror is retracted or pivoted upwardly out of the optical path to expose the film to a phototaking light through a focal-plane shutter. The retracted mirror abuts a stopper provided at an upper position in the camera and is held there during a predetermined exposure time to completely open the phototaking optical path. However, when the mirror is retracted it will be sprung back to produce a bounce whereby a part of the phototaking light path will be temporarily interrupted.

For preventing the bounce of the mirror, it has been proposed to weakening the retracting force or to locate the uppermost position of the retracted mirror extremely outside of the phototaking light path to decrease the effect of the bounce of the mirror. Further, there has been a proposal to use an air-damper as disclosed for example in U.S. Pat. No. 4,192,598 or to arrange a bounce preventing member having a cam surface to engage with a mirror driving pin as described in Japanese laid-opened utility model application No. 169522/1980.

However, when the retracting is weakened, the movement of the mirror becomes unstable, and when the uppermost position of the retracted mirror is set to a high position, it requires the camera body to be bulky. Moreover, when the air-damper is used, it is effective but costly. When the bounce preventing member having a cam surface to engage with the mirror driving pin is used, it was usual, for the purpose of decreasing the number of the constituting elements to decrease the cost, to move the bounce preventing member always following the movement of the mirror driving pin, and in this case the bounce preventing member must have a force opposing the movable mirror so that the actuation of the movable mirror becomes unstable similar to the case in which the retracting force to jump up the mirror is weakened. Further, if the cam surface to prevent descent of the mirror due to the bounce is shaped to operate more effectively, the cam surface will be too effective so that sometimes the movable mirror can not descend at all or the movement of the mirror becomes difficult at the time the movable mirror must come down after the shutter has been opened for a predetermined exposure time and the trailing curtain of the shutter was closed. Therefore, in practice, the cam surface must be used in a less effective shape.

SUMMARY OF THE INVENTION

The primary object of this invention is to provide a bounce preventing device for the movable mirror of a single lens reflex camera.

Another object of this invention is to commonly use a moving member to determine the exposure starting time as the member to prevent the bounce of the movable mirror.

The arrangement of the present invention provides in a single lens reflex camera a mirror movable between a first position located within a phototaking light path for observing a body to be photographed and a second position located outside of the phototaking light path when the photograph is taken, a drive member to drive the mirror in response to the release operation from the first position to the second position, a focal plane shutter to open and close an aperture, and a movable member movable for a predetermined distance after starting in response to the drive of the mirror. The movable member forcibly moves the mirror to go out of the phototaking light path, and after a predetermined time interval from the start of this movement, starts the shutter release operation.

The invention will be more apparent from the following detailed description referring to an illustrative embodiment shown in the accompanying drawing.

BRIEF DESCRIPTION OF THE DRAWING

FIGS. 4 to 6 show the actuation of the mirror drive mechanism, in which FIG. 4 shows the state in which shutter charging has been completed, FIG. 5 shows the state in which the shutter button is depressed, the movable mirror is raised and the delay gear is released and FIG. 6 shows the state in which the raising of the movable mirror has been completed and the mirror drive member is pushed up.

DESCRIPTION OF THE PREFERRED EMBODIMENT

Figure 1:
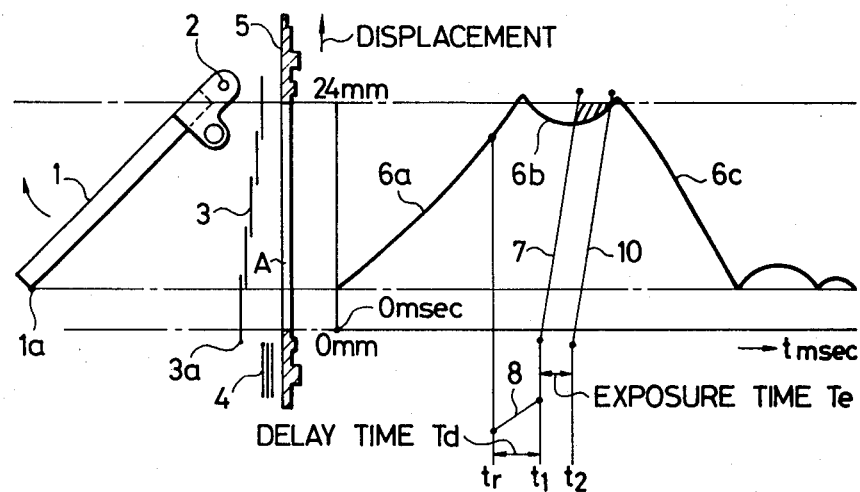
FIG. 1 shows the relation of the running curves between the movable mirror and the shutter curtain where a mirror bounce preventing device of this invention is not installed.

An embodiment of this invention will be described referring to the drawing. Firstly, reference is made to FIGS. 1 and 2 which show the running curves of the movable mirror and the shutter curtain, respectively.

FIG. 1 shows the case in which the mirror bounce preventing device of this invention is not adopted. In FIG. 1, a movable mirror 1 reflecting the phototaking light toward a not-shown finder rotates, at the phototaking time, from the state shown in FIG. 1 by 45° about a rotating axis 2 in the arrow direction. A shutter leading curtain 3 of the focal plane shutter consists of five divided blades. FIG. 1 shows state of the shutter charging before the release button is depressed and interrupting the phototaking light. The trailing curtain 4 consisting of four divided blades similar to the leading curtain 3 runs after the leading curtain 3 ran and a predetermined exposure time has passed.

Figure 2:
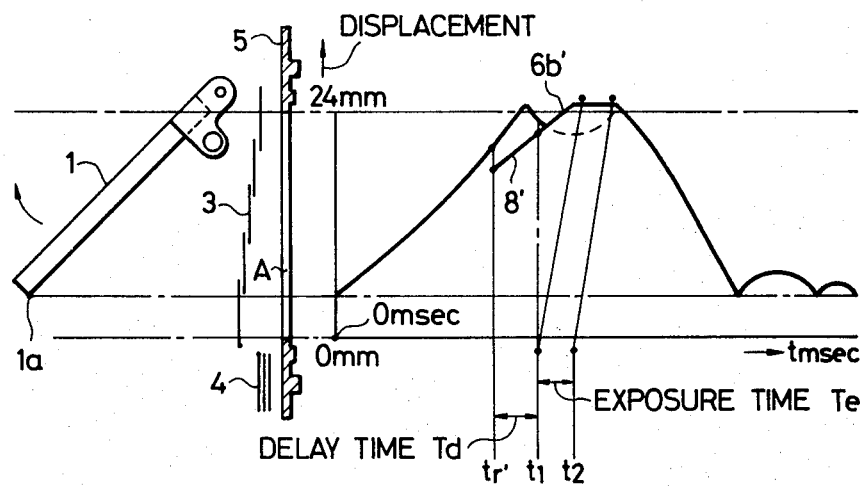
FIG. 2 shows the running curves of the movable mirror and the shutter curtain where an embodiment of this invention is installed.

Diecasting 5 of the camera body is shown in FIGS. 1 and 2 taking its aperture for phototaking an image plane as cross section and the distance between the top and bottom of the aperture is 24 mm. Such shutter device is described in, for example, U.S. Pat. No. 4,096,505.

The right side of FIG. 1 shows a graph representing running curves of the leading edge 1a (bottom edge) of the movable mirror 1 and the slit forming point 3a of the leading curtain 3, the abscissa showing time and the ordinate showing the displacements of each of the points 1a and 3a, respectively. The curve 6a, 6b and 6c is the running curve of the leading edge point 1a of the movable mirror 1, 6a plots the raising step of the movable mirror 1 after the release button is depressed, 6b shows the bouncing state of the mirror after it reaches its uppermost position, and 6c represents the movement of the movable mirror 1 after a predetermined exposure time has passed and entering into its descending step.

The curve 7 shows the running curve of the slit forming point 3a of the shutter leading curtain 3. As apparent from the graphs of FIG. 1, the shutter leading curtain 3 starts running after the final raising step of the movable mirror and is delayed further for a delay time Td of about 10–12 msec., and begins to open the image plane having 24 mm distance. The shutter leading curtain 3 opens the aperture A beginning from the bottom, and this opening position of the aperture successively goes up as the leading curtain 3 continues to run, and when the curtain 3 reaches the position of 24 mm, the opening position of the aperture faces the uppermost position of the movable mirror 1.

There are two objects to provide with the delay time Td of 10–12 msec., which is shown by the curve 8. The stop of the lens is gradually stopped down to a predetermined stop value as the mirror 1 is raised, and when the lens stop has been stopped down to the predetermined stop value, the stop blades will bounce and it takes a certain time before they settle at the predetermined stop position. The first object of the delay time is therefore to allow a certain delay time before the shutter leading curtain begins to run so as to assure the stopping of the shutter blades at the predetermined stop value. Next, the starting time tr of the shutter release is set in the final raising step of the movable mirror, but it may vary to a certain extent depending on the variation in manufacturing. If the shutter leading curtain starts to run before the starting time tr set, the problem arises between the moving period of the movable mirror after release operation and the running period (usually, it is 7 msec.) of the shutter leading curtain. If the shutter leading curtain runs faster than the movable mirror, the shutter leading curtain will open the aperture before the movable mirror reaches at its uppermost position, therefore the light from an object to be photographed directed to the film surface is eclipsed. The second object is therefore to provide a delay time between the shutter release starting time tr and the shutter leading curtain starting time $t_1$ to allow a proper tolerance. This delay is necessary not only in the case of the shutter curtain beginning to run from the bottom to the top of the aperture but also in the case of a high speed shutter wherein the running speed of the shutter curtain is extremely high or in the case in which the shutter curtain runs from the top to the bottom of the aperture.

The curve 10 in FIG. 1 shows the running curve of the shutter trailing curtain 4, which is released to run at the time $t_2$ after a predetermined exposure time Te has elapsed from the starting time $t_1$ of the shutter leading curtain and which closes the image plane aperture.

The eclipse of the light from an object to be photographed due to the bounce of the mirror when it has completed its raising step is explained with reference to FIG. 1. The running curve 6b shows the bounce of the mirror when the mirror has reached at its uppermost position. As seen from the curve 6b, since the mass of the movable mirror is great, while the drive spring to raise the mirror is rather weak, it is usual that only one large bounce occurs, as shown. The amount of eclips of the light from the object is shown in FIG. 1 by oblique lines surrounded by the curve 6b and the curves 7 and 10 representing the running of the shutter leading curtain and the trailing curtain, respectively.

The concept of the present invention will be described hereinafter referring to FIG. 2, which differs from FIG. 1 in the running curve 8' of the delay system. According to this invention, the shutter leading curtain 3 opens the aperture and, before it reaches the position corresponding to the uppermost position of the movable mirror 1, the delay system will, utilizing its inertia energy, cause the bouncing moving mirror 1 to move away from the phototaking optical path. At the time tr' to start shutter release at the final raising step of the mirror, the delay system starts to actuate, following the curve 8', and after a delay time td, which is about 8–10 msec., the shutter leading curtain starts to run. The delay system operates after the movement of the mirror 1 and, at its final stage, it impacts on the mirror during a bounce excursion to push the mirror up as shown by the curve 6b'. Consequently, when the shutter leading curtain 3 opens the upper part of the aperture A, the bounce of the movable mirror 1 has been suppressed. According to these running curves, shutter release is effected earlier by the time between the start of the leading curtain 3 and the arrival of the curtain at the position corresponding to the upper portion of the aperture. As mentioned, since one delay system plays a role of the shutter release and forcibly pushing the movable mirror away, after the mirror is pushed away, the shutter leading curtain will open the upper part of the aperture, which part corresponding to the portion at which the eclipse of the light is occurred by the bounce of the movable mirror as in FIG. 1, and therefore it becomes possible to eliminate the eclipse of the real image plane which otherwise occurs due to the bounce of the mirror.

In case of a high speed shutter or the case in which the shutter curtain moves from the top to the bottom of the aperture, the delay system should effect the shutter release during the pushing away of the mirror to avoid the eclipse of the light.

An illustrative embodiment of this invention is shown in FIGS. 3, 4, 5 and 6.

Figure 3:
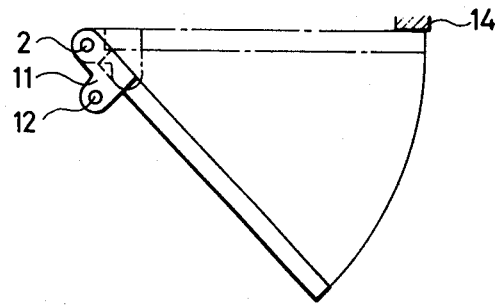
FIG. 3 shows a longitudinal cross section of the movable mirror.

In FIG. 3, mirror supporting member 11 is, at its left upper end, rotatably supported by shaft 2, and the movable mirror 1 is supported by the mirror supporting member 11. In condition to observe an object to be photographed, the mirror supporting member 11 inclines about 45° relative to the phototaking light path to reflect the light in the upper direction. On the other hand, when the release button is operated, the mirror drive pin 12 fixedly planted on the side surface of the member 11, is driven by the mirror drive member 13 (FIG. 4) to rotate around the shaft 2 counterclockwisely by about 45° and shifts upwardly until it abuts an elastic stopper 14 provided at the upper portion above the leading edge of the mirror and stops there.

The mirror drive mechanism is explained with reference to FIG. 4, which shows the state in which the winding up operation has been completed. The mirror drive lever 13 is rotatably mounted on the drive shaft 15 and has a hook part 13a that engages the lever 16 to stop mirror-up motion. The coil part of the mirror discending spring 18 is wound around the pin 17 planted on the lever 13. The foot portion of the spring 18 is bridged over the pin 12 and the lever 13 so that the supporting member 11 integral with the pin 12 is energized in the counterclockwise direction. The pin 19 planted on the lever 13 abuts the delay gear stop lever 23 to rotate the latter.

On the shaft 15, the stopping-down lever 20 is pivoted and the coil part of the spring 21 is wound around the shaft 15. One end of the spring 21 engages the folded part 13b of the lever 13 and the other end thereof engages a not-shown folded part of the lever 20. Thus the levers 13 and 20 are energized in clockwise and counterclockwise directions, respectively. The pin 22 planted on the lever 13 abuts the jaw part 20a of the lever 20, so that the levers 13 and 20 are integrally interconnected by the spring 21.

The delay gear stop lever 23 and the lever 24 are mounted on the shaft 25. The coil part of the spring 26 is wound around the shaft 25 and the spring 26 energizes the levers 23 and 24 in counterclockwise and clockwise directions, respectively. The stop part 27 formed by folding the plate of the mirror box MB serves to stop the rotation of the levers 23 and 24.

The delay gear stop lever 23 has a hook part 23a. The delay gear 29 is clockwisely energized about the shaft 15 by the delay gear spring 28, one end of which engages a folded part of the plate of the mirror box MB. In normal, the hook part 23a engages the hook part 29a of the delay gear 29, which meshes with the idle gear 30 meshing with the fly wheel 31. One end 29b of the delay gear 29 is formed as a cam surface which abuts one end 34a of the shutter release lever 34 which is counterclockwisely energized about the shaft 32 by the spring 33. The other end 34b of the lever 34 will engage with the leading curtain stop lever 35 as the lever 34 rotates in counterclockwise direction so as to start the shutter release operation.

The lever 38 is energized clockwisely around the shaft 36 by the spring 37. The mirror raising spring 40 engages with pin 39 planted on the lever 38 and the raised part 13c of the lever 13, respectively, to energize the lever 13 in clockwise direction.

The lever 41 moves downwardly in response to the completion of the running of the shutter trailing curtain, and by this movement, the lever 24 disengages from the lever 38. The branch part 13d of the lever 13 will abut the pin 39 as the lever 38 rotates counterclockwise to rotate the lever 13 in counterclockwise direction, which in turn causes the raised part 29c of the lever 29 to abut the branch part 13d to let the lever 29 rotate in unison in counterclockwise direction.

The operation of the above described embodiment will now be explained.

Figure 4:
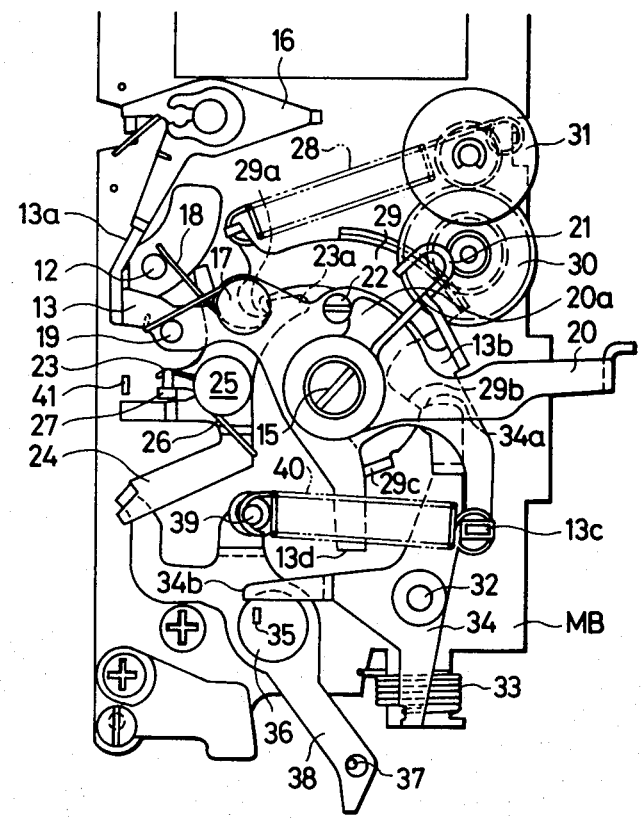

FIG. 4 shows the state in which the winding up operation has been completed. In this state, the lever 38 is stopped by the lever 24 so that the mirror drive lever 13 is energized in the clockwise direction about the shaft 15 by the energized mirror raising spring 40. However, in the state of FIG. 4, the lever 13 is prevented from rotating by the suppression lever 16. There is a small space between the lever 13 and the mirror drive pin 12 and the supporting member 11 supporting the movable mirror is maintained at its 45° inclined position as shown in FIG. 3 by the mirror descending spring 18. To one end 29b of the delay gear 29 stopped by the delay gear stop lever 23, abuts one end 34a of the shutter release lever 34 so that the actuating position of the lever is determined. The stoppingdown lever 20 together with the lever 13 is in the state of being rotated counterclockwisely so that the stop of the lens is fully opened.

Figure 5:
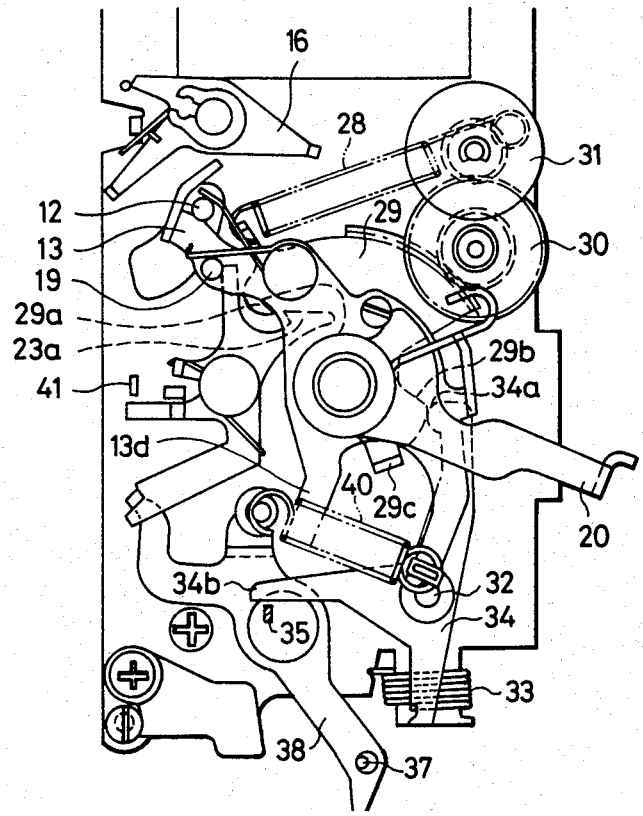

As the release button is operated, the lever 16 rotates clockwise as shown in FIG. 5 to release the lever 13. Then the lever 13 begins to rotate clockwise by the force of the spring 40 to push up the pin 12 to raise the movable mirror 1. At the final stage of the mirror raising step, the pin 19 of the lever 13 engages the lever 23 to rotate the latter clockwise so that the hook part 29a of the gear 29 is released from the hook part 23a of the lever 23. The released gear 29 rotates clockwise by the force of the spring 28. At this time, the fly wheel 31 is rotated through the idle gear 30 and in this case it is so designed that it takes, for example, about 10 to 12 msec. until the rotation of the gear 29 has been finished. During the rotation of the gear 29, one end 34a of the gear 34 which contacts one end 29b of the gear 29, will slide up on the surface of the cam surface 29b in counterclockwise direction. Thus the other end 34b of the lever 34 descends the shutter leading curtain stop lever 35 to release the leading curtain at the end of the rotation of the gear 29 so as to start the running of the leading curtain. Meanwhile, the lever 20 integrally rotates with the lever 13 in clockwise direction to stop down the lens stop.

Figure 6:
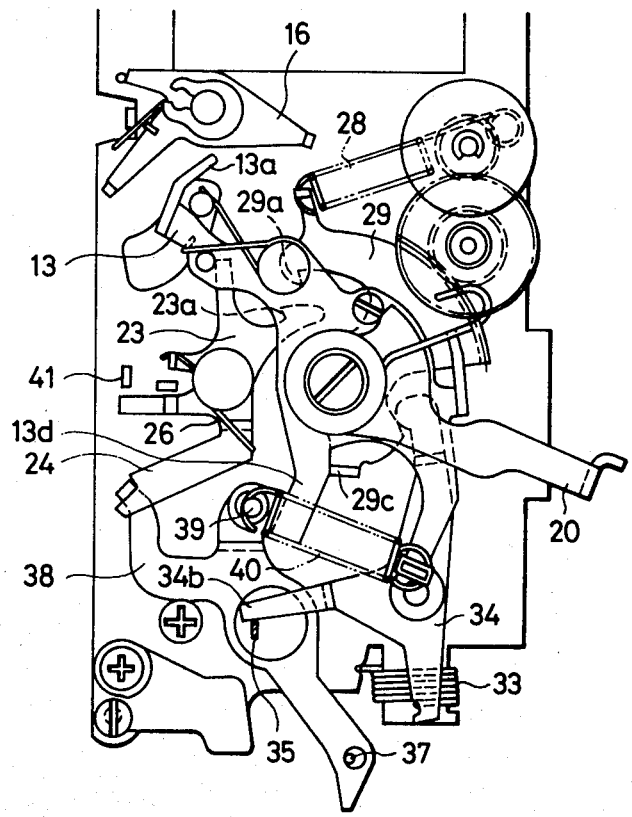

Since the gear 29 begins to rotate clockwise after the rotation of the lever 13, the branch part 13d of the lever 13 departs from the raised part 29c of the gear 29 for a while as shown in FIG. 5. However, when the raising of the mirror has been completed, the raised part 29c will again engage the branch part 13d to suppress the lever 13. Thus it is apparent that the lever 13 is further pushed in the clockwise direction by utilizing the energy stored in the fly wheel 31 so as to complete the mirror retracting operation and to eliminate the bounce of the mirror as explained in the foregoing referring to FIG. 2, and the eclipse of the light coming from the object can be prevented. This state is shown in FIG. 6.

After the shutter leading curtain has been released and a predetermined exposing time passed, the shutter trailing curtain starts to run. In response to the completion of the running of the shutter trailing curtain, the lever 41 moves downwardly to rotate the lever in counterclockwise direction against the spring 26. Thus the lever 38 is released and rotated in the clockwise direction by the force of the spring 37. By the clockwise rotation of the lever 38, the pin 39 rotates the lever 13 counterclockwise through the branch part 13d, which will abuts the raised part 29c of the gear 29 and the gear 29 rotates in counterclockwise direction. Thus the spring 28 is charged, and the hook part 29a of the gear 29 falls into the hook part 23a of the lever 23 and also the hook part 13a of the lever 13 engages the lever 16.

Next, a not shown winding-up lever is actuated to effect winding-up operation, the lever 38 rotates counterclockwise against the spring 37 and upon completion of the winding-up operation, the lever 38 engages the hook part of the lever 24. During this period, the springs 40 and 37 are energized so that all of the elements return to the charge completion state as shown in FIG. 4.

In the illustrative embodiment explained in the foregoing, the delay mechanism to cause a pause between the mirror retraction and the shutter release is installed within the mirror drive mechanism instead of the shutter unit which is conventional so as to prevent the bounce of the mirror when it reaches its uppermost position. However, it is possible to maintain the conventional delay mechanism as it is and install a separate bounce preventing mechanism within the mirror drive mechanism.

I claim:

1. A device for preventing bounce of a movable mirror of a single lens reflex camera having the movable mirror movable between a first position located within a phototaking light path for observing an object to be photographed and a second position located outside of the phototaking light path when phototaking is effected, a drive member to drive the mirror in response to the release operation, from the first position to the second position, and a focal plane shutter to open and close an aperture for an image plane, the device comprising a movable member arranged to move a predetermined distance in response to the drive of the mirror, the movable member forcibly moving the mirror out of the phototaking light path and, after a predetermined time interval from the start of the movement of said movable member, starting the shutter release.

2. A device according to claim 1, in which said movable member starts its operation at a predetermined timing during the drive of the mirror, and further, forcibly moves the mirror out of the phototaking light path before the shutter opens a part of the aperture substantially corresponding to the second position of the mirror.

3. A device according to claim 2, in which the movable member starts its operation in association with the drive member after the mirror is moved a predetermined distance so as to forcibly push the drive member in the direction of the mirror drive.

4. A device according to claim 3, in which said movable member comprises a rotatable delay member, a fly wheel connected to the delay member and an energizing member to energize the delay member toward a predetermined direction, the delay member actuating after the mirror is driven for a predetermined amount by the drive member and moving in the mirror drive direction following the movement of the drive member.

5. A device for preventing bounce of a movable mirror of a single lens reflex camera having the movable mirror movable between a first position located within a phototaking light path for observing an object to be photographed and a second position located outside of the phototaking light path when phototaking is effected, a drive member to drive the mirror in response to the release operation, from the first position to the second position, and a focal plane shutter to open and close an aperture for an image plane, the shutter including a leading curtain, the device comprising a movable member arranged to move a predetermined distance in response to the drive of the mirror, the movable member forcibly moving the mirror out of the phototaking light path, and release means arranged to release the focal plane shutter to cause a state in which the leading curtain of the focal plane shutter opens a region of the phototaking light path where an eclipse would occur due to the bounce of the movable mirror, after the mirror has been forcibly moved out of the phototaking light path by the movable member.

6. A device for preventing bounce of a movable mirror of a single lens reflex camera having the movable mirror movable between a first position located within a phototaking light path for observing an object to be photographed and a second position located outside of the phototaking light path when phototaking is effected, a drive member to drive the mirror in response to the release operation, from the first position to the second position, and a focal plane shutter to open and close an aperture for an image plane, the shutter including a leading curtain, the device comprising a movable member arranged to move a predetermined distance in response to the drive of the mirror, the movable member forcibly moving the mirror out of the phototaking light path before the leading curtain of the focal plane shutter opens a part of the aperture substantially corresponding to the second position of the mirror.

* * * * *